May 6, 1930.  C. A. SPRAGUE  1,757,443

SUBMARINE CABLE

Filed Sept. 11, 1926

Inventor:
Clarence A. Sprague,
by E. W. Griggs
Attorney

Patented May 6, 1930

1,757,443

UNITED STATES PATENT OFFICE

CLARENCE A. SPRAGUE, OF EAST ORANGE, NEW JERSEY, ASSIGNOR TO WESTERN ELECTRIC COMPANY, INCORPORATED, OF NEW YORK, N. Y., A CORPORATION OF NEW YORK

SUBMARINE CABLE

Application filed September 11, 1926. Serial No. 134,819.

This invention relates to submarine cables and apparatus to be used therewith.

Heretofore it has been impracticable to build long submarine cables, such, for example, as those between Newfoundland and England, which would be adapted simultanenously to transmit a plurality of carrier currents of different frequencies for duplex or multiplex operation. Owing to the great attenuation of the signaling currents by these long cables and the distortion introduced by the large distributed capacity and other characteristics of the cable, the only practical methods of signaling have been those involving very low frequencies, such as are used in low speed, direct current operation.

An object of this invention is to increase the signal carrying capacity of long submarine cables. Related objects are to obtain multiplex operation, secrecy and reduction in cost of cable systems.

In the carrying out of these objects I provide a termination of the cable proper at sea and a plurality of separate short cables, preferably of different construction from the main cable, extending from the termination of the main cable to the same or different points on shore. Submersible electric wave filters are provided in the main cable or the auxiliary cables, or both, to permit the auxiliary cables of a terminal system to carry signaling currents of different frequency ranges, respectively, which are all united on the main cable and separated again at the distant main cable terminal. By placing the termination of the main cable far at sea, and thus greatly shortening it, and by properly constructing the main cable and auxiliary cables, the main cable is made to carry a band of frequencies much wider than that heretofore in use. The cost of such a cable system is much less than that of separate cable systems of a combined equal carrying capacity; secrecy is obtained as effectively as over separate cables, if desired; and a more adaptable and flexible system is obtained.

When, as is the practice, dots and dashes of the Morse code are transmitted by positive and negative impulses respectively, the duration of the dot being equal to that of the dash, a dot followed by a dash produces a complete cycle of varying current which determines the "dot-dash" frequency. Since the wave is square-topped it consists of a sine wave of dot-dash frequency and certain waves of harmonic frequencies producing the square corners. Until recently, the highest dot-dash frequencies employed have been of the order of ten cycles per second. The transmission of harmonic frequency components up to at least twice the dot-dash frequency has been necessary to reproduce the signals well enough to be intelligible. The attenuating property of cables increases very rapidly with the frequency so that a small increase in dot-dash frequency results in a wiping out by the cable of the necessary harmonic frequencies. Many other difficulties also have been encountered whenever an attempt to increase speed of signaling has been made.

Recently, trans-oceanic cables inductively loaded with permallory have been built and laid. This development has permitted a marvelous increase in speed of signaling, the dot-dash frequency having been increased to more than seventy cycles per second on a cable 2300 miles in length. But certain new limiting factors have been introduced by the loading—notably, distortion introduced by the loading material at high frequencies. Duplex operation has not been adopted on the new cables because of the difficulties encountered in balancing the cable at high frequencies. Multiplex-carrier operation is therefore not feasible with the present types of cable systems. In accordance with this invention these difficulties are overcome and multiplex-carrier operation becomes practical.

The invention will be better understood by reference to the following description and the accompanying drawing.

Figure 1:
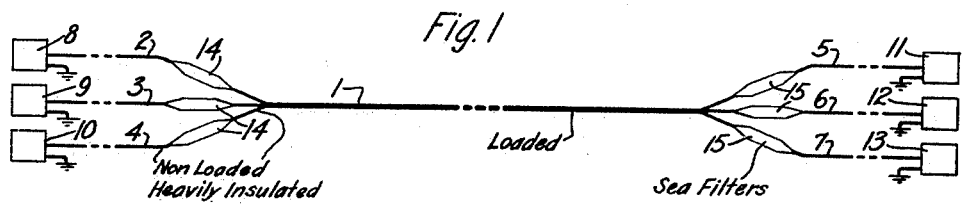
Fig. 1 is a schematic showing of a cable system in accordance with the invention.

The submarine cable 1 is preferably an inductively loaded high-speed cable which preferably terminates several hundred or many hundred miles at sea. Joined to one terminal of this cable are separate non-loaded cables 2, 3 and 4 which preferably terminate at separate cable stations 8, 9 and 10, respectively. The other terminal of the main cable is likewise joined to three auxiliary cables 5, 6 and 7 terminating at cable stations 11, 12 and 13, respectively. Submersible filters 14 and 15 are provided in the auxiliary cables adjacent the main cable.

Filters 14 and 15, in branches 2 and 5, respectively, may, for example, be designed to pass frequencies in the range from zero to 100 cycles. The filters in branches 3 and 6 may transmit frequency bands from 100 to 200 cycles and the filters in branches 4 and 7 may transmit a frequency range from 200 to 500 cycles. The currents within these frequency bands are superimposed upon one another upon the main cable which can be designed to transmit such a wide band of frequencies because of its being short compared with the cables mentioned above and because the impressed currents are small due to their being greatly attenuated before they reach this cable. If the cable system is to connect North America and England the main cable may, for example, be from 800 to 1500 miles in length.

The frequency bands may be utilized in any known suitable manner. For example, channel 2, 1, 5 may be utilized to transmit so-called direct signals by Morse code while the remaining channels are used to transmit two carrier currents respectively, with their side bands. As is common in carrier current transmission one side band may be suppressed at the transmitting station in order to narrow the transmission band. Either duplex or simplex operation over any of the channels may be maintained. Duplex operation may be used since the band of frequencies for which balance must be obtained is limited and loading, which might introduce balancing difficulties, is eliminated from the auxiliary cables. One or more of the frequency bands may, if desired, be utilized to transmit a plurality of separate carriers, other filters being employed at the terminal stations to separate these transmission bands. Some of these carriers may be transmitted in one direction and others in the other direction, as is the practice or has been suggested for the operation of carrier current land systems. Moreover, if the distance between the terminals is not too great much higher frequency carrier currents may be employed, such, for example, as those used in the cable system extending between Key West and Havana and described in a paper by W. H. Martin, G. A. Anderegg and B. W. Kendall, published in the Journal of the American Institute of Electrical Engineers, March, 1922.

The main cable 1 is preferably somewhat larger than those now in use and the non-loaded auxiliary cables are preferably somewhat more heavily insulated than cables now in use to permit the use of a somewhat larger transmitting voltage to compensate for the added attenuation introduced by the sea filters.

The main cable should be designed to avoid intermodulation effects so far as possible, as, for example, by employing loading material having as nearly constant permeability as possible over the operating range of magnetizing forces and having as small hysteresis loss as possible.

The impedances should, of course, be matched throughout the system so far as possible. If some reflection, should, however, take place at the filters at the transmitting terminal, the effect of the reflected waves upon the receiving apparatus at the same station would be small due to the fact that the filter is so far removed from the terminal that the reflected waves would be greatly attenuated.

Figure 2:
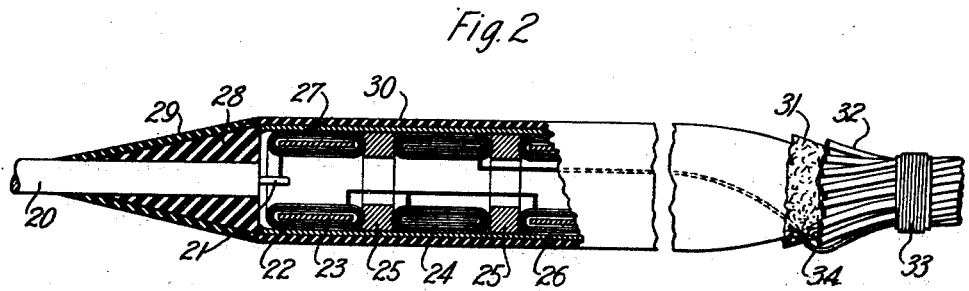
Fig. 2 is a detailed view, partly in section, of a submersible electric wave filter suitable for use in systems involving this invention.

Fig. 2 shows a submersible filter which may be used in systems in accordance with this invention. It is, in the main, similar to loading coil sections which have been used or suggested for use in submarine cables, the principle difference being that condenser units similar in shape to the coil units heretofore used are assembled in the casing with the coil units, and provision is made for grounding one side of the filter. Other types may be used.

One end of the cable core 20 to be joined to a filter has a short section 21 of the bare conductor protruding from the gutta percha insulation. The toroidal coil units 22 and 26 are made up of windings around the cylindrical core 23. The condenser units 24 are made up of alternate layers of insulation and conductor plates formed into a roll, flattened and having the ends of the roll brought together to form a cylindrical unit as shown, which may be of the same or a different length than the coil units. The casing contains other similar units, not shown.

To lend flexibility to the structure resilient spacers 25 of rubber or other suitable material are employed.

The spacers, condensers and coils are assembled and held together by a layer of taping 27 after suitable electrical connections have been made between the coils and condensers. Since the return conductor is the sea water, one side of the filter must be electrically associated with the sea water. This is done by means of the conductor 34 which extends through the casing and is soldered or brazed to the armour wires.

Gutta percha cones 28 are slipped over the gutta percha core and the gutta percha sleeve 30 is slipped over the taped cylinder 27 and tooled down upon the cones 28. The cone 28 in turn is tooled down over the core 20. An outer cone 29 of gutta percha is placed over the cone 28 and tooled down both on the tube 30 and on the core 20. The various gutta percha parts are then autogenously united.

The space within the assembled coils and condensers may, if desired, be filled with gutta percha.

The filter assembly is covered with a layer of jute 31 upon which armour wires 32 are placed, the same as the main portion of the cable. The armour wires 32 may be bound by a band of wires 33. An additional layer of jute and armour wires may be employed. For a more complete disclosure as to the method of placing the armour wires, reference is made to British Patent 5547 of 1907.

The filter shown in Fig. 2 is a low pass filter and is merely illustrative.

Figure 3:
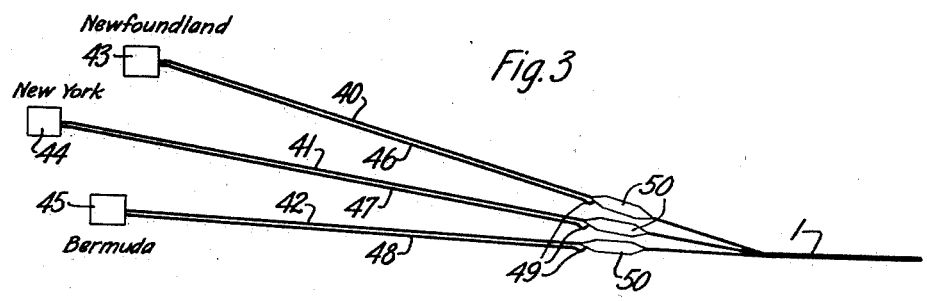
Figs. 3 and 4 are schematic views of modifications of the system in Fig. 1.

Fig. 3 discloses a modified system in which the main cable 1 is connected to auxiliary cables 40, 41 and 42 extending to terminal stations 43, 44 and 45, respectively, which may be located, for example, at Newfoundland, New York and Bermuda. Filters 50 are placed in the auxiliary cables as in the arrangement shown in Fig. 1. This system differs from that of Fig. 1 in the use of twin core cables from the filters to the terminal stations in place of the single core cables of the system of Fig. 1. The metallic return conductors 46, 47 and 48 are grounded at the filters. This arrangement adds greatly to the privacy of the system since unauthorized tapping becomes practically impossible. In the system of Fig. 1 it would be impossible, of course, for the operator at one station to obtain any messages intended for the other stations. The system of Fig. 3 has the additional advantage that it would be impossible for the cable sections to be tapped by one desiring to obtain secret information. Another advantage of the twin core cable arrangement is that interference due to the proximity of the auxiliary cables with each other or with other cables is largely avoided. These and other advantages of twin core cables are well known to cable engineers but in accordance with this invention cables of this type are combined with a single core cable in a novel manner.

Instead of placing the sea earth terminations 49 at the filters 50 they may be placed at the exact terminal of the main cable section 1. Ordinarily the filters are close to the main cable terminal, but may be removed a considerable distance therefrom.

Figure 4:
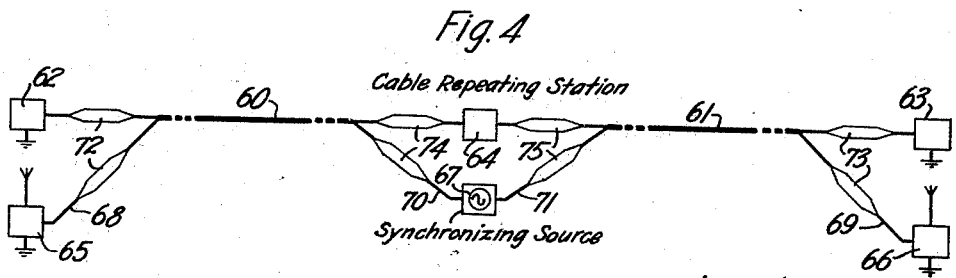

Fig. 4 discloses a system in which a cable repeating station 64 is shown inserted in the main cable 60 and 61 which terminates at cable stations 62 and 63, respectively. Radio signaling stations 65 and 66 are associated with the auxiliary cables 68 and 69. Submersed filters 72 and 73 render possible the transmission of one band of frequencies to the radio stations and a different band to the cable stations. The channel to the radio stations so formed may be used for any desired purpose as, for example, to synchronize the transmitting and receiving apparatus at the two stations. This can be done more satisfactorily by placing the synchronizing source 67 at or near the cable repeating station and associating it with the main cables through auxiliary cables 70 and 71. Submersed filters 74 and 75 may be employed if complete control of the synchronizing source separate from that of the cable repeating station is desired.

While it is preferred to load the main cable and use non-loaded auxiliary cables it is within the scope of the invention to construct any of the cables with or without loading as the length of the cable and other conditions dictate. The auxiliary cables, as stated above, preferably terminate in separate stations. They may, however, terminate in the same station. It is within the invention to combine the separate terminal cables into a single cable if desired.

For a description of a cable suitable for use as a loaded cable in systems involving this invention, reference is made to patent to O. E. Buckley, No. 1,586,874, June 1, 1926.

What is claimed is:

1. A terminal arrangement for a submarine signaling cable comprising a plurality of auxiliary cables extending from shore and joined to the terminal of the main cable at sea and a submersed electric wave filter containing inductance and capacity elements in at least one of said auxiliary cables.

2. A terminal arrangement for a submarine signaling cable comprising a plurality of auxiliary cables extending from shore for several hundred miles and there joined to the main cable and filtering means in at least one of said auxiliary cables.

3. A terminal arrangement for a submarine signaling cable comprising a plurality of auxiliary cables extending from shore and joined to the main cable, submersed electric wave filters in each of said branches and terminal apparatus for impressing signaling currents involving different ranges of frequencies upon said auxiliary cables, respectively.

4. A terminal arrangement for an inductively loaded submarine signaling cable comprising a plurality of non-loaded auxiliary cables extending from shore to a point at sea and there joined to said inductively loaded submarine cable.

5. A terminal arrangement for an inductively loaded submarine signaling cable comprising a plurality of non-loaded auxiliary cables extending from shore to a point at sea and there joined to said inductively loaded cable and a submersed electric wave filter in at least one of said auxiliary cables.

6. A terminal arrangement for an inductively loaded submarine signaling cable in accordance with claim 5, each of the auxiliary cable conductors being more heavily insulated than said inductively loaded cable.

7. A terminal arrangement for a submarine signaling cable comprising a plurality of auxiliary cables extending from shore to a point at sea and there joined to the main cable, a submersed electric wave filter in at least one of said branches and means for impressing steady alternating current upon one of said auxiliary cables and variable signaling current upon another of said auxiliary cables.

8. A signaling system comprising a submarine cable, a cable terminal station, a radio signaling station, auxiliary cables connecting said stations with said first mentioned cable at a point at sea and submersed electric wave filters in at least one of said auxiliary cables.

9. A signaling system in accordance with claim 8, including means for impressing synchronizing current upon said auxiliary cable extending from said radio station.

10. A terminal arrangement for a submarine signaling cable comprising a plurality of twin core auxiliary cables extending from shore to the main cable at a point at sea, one conductor of each of the auxiliary cables being grounded at sea in the vicinity of the junction with the said main cable.

11. A terminal arrangement for a submarine signaling cable as in claim 10 and a submersible electric wave filter in each of said auxiliary cables.

12. A submersible electric wave filter comprising a cylindrical casing, cylindrical inductance elements and cylindrical capacity elements in said casing coaxial therewith.

13. A submersible electric wave filter comprising a casing, armor wires around said casing, inductance and capacity elements in said casing constituting a filter and a conductor leading from one terminal of said filter through said casing and conductively secured to said armor wires to form a sea ground.

14. A signaling system comprising two radio stations, a channel including a suboceanic cable extending from one of said stations to the other, a frequency setting wave source at a point in said system, and means including at least a part of said channel and at least a part of said cable whereby waves from said source are supplied to at least one of said stations.

15. A system in accordance with the foregoing claim in which the source is at an intermediate point on said cable and supplies frequency setting waves to each of said radio stations over a part of said cable.

In witness whereof, I hereunto subscribe my name this 8th day of September A. D., 1926.

CLARENCE A. SPRAGUE.